3,247,111
HIGH TEMPERATURE JET LUBRICANT
Edward A. Oberright and Herbert L. Hepplewhite, Woodbury, N.J., assignors to Socony Mobil Oil Company, Inc., a corporation of New York
No Drawing. Filed Apr. 8, 1963, Ser. No. 276,114
17 Claims. (Cl. 252—34.7)

This invention is concerned with lubricant compositions and, more specifically, is concerned with lubricants adapted for use in aircraft jet engines and in other equipment operated under severe conditions.

With the advent of jet aircraft, new lubrication problems have arisen. It was early discovered that mineral oil compositions would not meet the requirements of such engines. Even mineral oils bolstered with one or more additives were found to be seriously deficient.

One of the first answers to the problem posed by jet aircraft lubrication was the development of synthetic ester lubricants. A variety of esters has been tried and only a few used as base fluids in formulating gas turbine lubricants. The first ester used in volume was di-2-ethylhexyl sebacate. When this ester was properly formulated with antioxidants, the resulting compositions satisfied the requirements of the first generation jet engines covered, in general, by specification MIL-L-7808. A second generation or advanced type of jet engines, the turbo-fan type, operates at high temperatures and, therefore, requires lubricants of greater capabilities than those formulated with the diesters.

Next in sequence was a development of triesters and tetraesters formulated from "hindered" alcohols, that is, alcohols that do not have any hydrogen atoms on the beta carbon thereof. Such esters have been found to be more thermally stable than the diesters typified by the foregoing sebacate ester. Triesters have been made from triols such as trimethylol propane and tetraesters have been made from a tetraol such as pentaerythritol. Acids used to form the tri- and tetraesters are generally straight- or branched-chained aliphatic acids or mixtures thereof. Triester and tetraester lubricant compositions developed to date, however, have proven to be only slightly superior to the sebacate ester referred to above. Although such triester and tetraester compositions meet the more recent military specification, MIL-L-9236, they are corrosive to metals, especially lead, copper and magnesium even when stabilized by antioxidants. This is a serious matter since the metals mentioned are present in jet engine parts used today.

The current trends to higher heat rejection and less supplementary cooling equipment in present and prototype aircraft gas turbine engines have resulted in increased demands for improved thermal and oxidative stability and cleanliness characteristics of a lubricant. This trend is typified by the forward-fan engine which operates at temperatures approximately 100° F. higher than its non-fan counterpart (operated at 400–500° F.). These higher temperature requirements have created a need for formulation of new products which would maintain adequate lubrication under extreme thermal stress and, at the same time, provide the cleanliness characteristics commensurate with longer drain periods and less frequent overhauls of an engine.

At this time, therefore, a lubricant to be used in aircraft jet engines must meet the following rigorous standards, in combination:

(1) it must remain stable and fluid, and be operative, over a wide range of temperatures,
(2) it must have low volatility at high temperatures,
(3) it must have thermal stability,
(4) it must operate without formation of coke or sludge in an engine such that the engine operates cleanly,
(5) it must have load-carrying ability,
(6) it must operate without wear of metal parts,
(7) it must be an excellent lubricant,
(8) it must, when combined with suitable oxidants, be resistant to oxidation at high temperatures and be non-corrosive to the metals present in the engine,
(9) it must have a low pour point, such that it can be used or stored at temperatures at low as −80° F.,
(10) it must be substantially non-foaming.

It must meet at least all of the standards listed above and, in addition, make possible the following benefits: longer periods between engine overhauls; less frequent oil drains; and lower oil consumption.

It has been recognized that no one lubricant, such as a synthetic ester, can meet such strict standards; the ester or other base lubricant must be fortified with one or more additives to improve its characteristics. Yet, no one additive nor combinations of additives proposed heretofore has fortified the lubricant base satisfactorily. There has developed, then, a demand for a lubricant base in association with a group of additives to make possible a final lubricant composition which will meet the standards set out above. The present invention is aimed at development of lubricant compositions capable of meeting such an unusual combination of standards.

It is an object of the present invention, therefore, to provide lubricating compositions capable of effectively lubricating jet aircraft engines operated under rigorous conditions. It is another object of the invention to provide lubricating compositions effective in lubrication of other equipment operated under severe conditions. Another object is to provide lubricant compositions capable of meeting the several standards grouped hereinabove. Still another object of the invention is to provide oil concentrates containing particularly effective combinations of additives for use in lubricant compositions. A further object of the invention is to provide new compositions of matter comprising combinations of additives which can be incorporated in synthetic esters to enhance the lubrication value thereof. Additional objects will be apparent from the following description.

The foregoing objects have been realized with lubricants comprising the following components:

(a) a major proportion of an ester formed by reaction of a pentaerythritol and an organic acid having from about 2 to about 18 carbon atoms per molecule;

(b) from about 0.5 to about 5 percent by weight of the lubricant of an antioxidant;

(c) from about 0.0001 to about 1 percent by weight of the lubricant of an equimolecular salt of 1-salicylalaminoguanidine and an aliphatic carboxylic acid having from about 14 to about 18 carbon atoms per molecule;

(d) from about 0.001 to about 1 percent by weight of the lubricant of a polyhydroxy-anthraquinone; and (e) from about 1 to about 10 percent by weight of the lubricant of a phosphorus compound selected from the group consisting of a neutral organic phosphate and a neutral organic phosphite.

While the lubricants formed with components (a) through (e), above, meet the standards stated above, it has been found that still more advantageous lubricants are prepared by including from about 0.0001 to about 0.01 percent by weight of the lubricant of a defoamant (f).

As indicated above, component (a) is an essentially neutral ester or a mixture of esters of a pentaerythritol. While the mono compound—tetramethylolmethane—is preferred herein for the advantageous esters formed therefrom, it is to be understood that polypentaerythritols can be used. These include the di-, tri- and tetra-pentaerythritols.

Acids used herein in forming the esters (a), contain from about 2 to about 18 carbon atoms per molecule. These include straight chain and branched chain aliphatic, cycloaliphatic, aromatic and mixtures of one or more of such acids. Typical acids are the following: acetic, butyric, valeric, isovaleric, caproic, pelargonic, decanoic, dodecanoic, isodecanoic, hexadecanoic, benzoic, nonylbenzoic, dodecylbenzoic, naphthenic acids, cyclohexylacetic, etc. Particularly preferred herein, however, are pelargonic acid and valeric acids. Outstanding is a mixture of pelargonic acid, normal valeric acid and isovaleric acid, as shown hereinafter in the illustrative examples.

Methods for the preparation of the esters (a) are well known in the art. By way of illustration, reference is made to the text "The Pentaerythritols" by Berlow, Barth & Snow, Reinhold Publishing Corporation, New York 1958, chapter 13.

Antioxidants (b) as used herein can be defined as "chain stopper" type materials. These include amines, phenols, esters, phosphites, etc. Representative of such antioxidants are:

diphenyl amine
dinaphthyl amine
phenyl-alpha naphthyl amine
butyl-alpha naphthyl amine
phenyl-beta naphthyl amine
ditolyl amine
phenyl tolyl amine
tolyl naphthyl amine
dioctyl diphenyl amine
dicyclohexyl amine
diphenyl p-phenylene diamine
mixtures of mono- and di-heptyl diphenylamines
4-tertiary butyl catechol
2,4-dietertiary butyl p-cresol
2,6-ditertiary butyl-4-methyl phenol
hexyl gallate
tritertiary amyl phenyl phosphite
polymerized trimethyl dihydroquinoline
phenothiazine.

Particularly outstanding in the compositions of this invention, however, is a combination of phenyl-alpha naphthyl amine and dioctyl diphenyl amine.

Component (c) is a metal suppressor or copper surface passivator. This is an equimolecular salt of 1-salicylolaminoguanidine and an aliphatic carboxylic acid having from about 14 to about 18 carbon atoms per molecule. The acid can be saturated or unsaturated. There can also be present as part of the acid portion of such a salt, up to about 25 percent by weight of such portion of rosin acids. A particularly preferred salt is one of 1-salicylalaminoguanidine and a mixture of acids comprising about 80 percent by weight of a mixture of fatty acids having 14 to 18 carbon atoms, at least about 50 percent of the acids being unsaturated, about 20 percent by weight of the acid mixture being rosin acids, and the acid mixture being obtained by fractionation of tall oil. This preferred salt is in the form of a 50 percent solution of the salt in an alcohol mixture comprising 12 percent of isopropyl alcohol and 88 percent of methyl alcohol. The preferred salt is identified hereinafter as "Salt A."

A second metal suppressor or deactivator (d) is also used herein. This is a polyhydroxyanthraquinone and particularly a dihydroxy compound. These include a number of isomers such as the following: 1,2; 1,3; 1,4; 1,5; 1,8; and alkyl substituted derivatives thereof such as, isobutyl 1,4 dihydroxyanthraquinone; etc. Particularly outstanding in the compositions of this invention is the 1,4 isomer, commonly known as quinizarin.

As indicated hereinabove, particularly advantageous compositions of this invention include component (e), which is a neutral organic ester of phosphorus either in the form of a phosphate or a phosphite. Typical of such compounds are the following: triphenyl phosphate, phenyl dicresyl phosphate, tricresyl phosphate, methyl di-tertiary butyl phosphate, tri (n-butyl) phosphate, tri (2-ethylhexyl) phosphate, tri-o-tolyl phosphate, tri-m-tolyl phosphate, tri (p-tertiaryamyl phenol) phosphate, tri (methylcyclohexyl) phosphate, tri (n-butyl phosphite), triphenyl phosphite, tritolyl phosphite, tricyclohexyl phosphite, etc. Preferred herein is tricresyl phosphate.

Although the composition of this invention containing components (a) through (e), are substantially free from a tendency to foam during use, it has been found that a foam inhibitor (f) cooperates with the other components to substantially obviate foam formation. While any of the defoamants known for use in oils can be used herein, preferred are lower alkyl silicone polymers. Typical of such materials are dimethyl silicone, diethyl silicone, methylethyl silicone, methylpentyl silicone, etc. Dimethyl silicone is particularly preferred herein.

An important feature of the lubricant compositions of this invention is the relative proportions of each component therein. It has been discovered that a selective balance of the components must be maintained, in order to achieve the desired results therewith. Given below in Table I are broader and preferred ranges of concentrations, to be followed in realizing the desired results.

TABLE I

| Component | Broad range, percent by weight | Preferred range, percent by weight |
| --- | --- | --- |
| a | 90–97 | 92–95 |
| b | 0.5–5 | 1–3 |
| c | 0.001–1 | 0.1–0.3 |
| d | 0.001–1 | 0.1–0.3 |
| e | 1–10 | 3–5 |
| a | 90–7 | 92–95 |
| b | 0.5–5 | 1–3 |
| c | 0.001–1 | 0.1–0.3 |
| d | 0.001–1 | 0.1–0.3 |
| e | 1–10 | 3–5 |
| f | 0.0001–0.01 | 0.0001–0.001 |

As illustrated in several typical examples given hereinafter, criticality exists between the proportions of the several components shown above in Table I.

Lubricant concentrates are also contemplated by the invention. For example, much less ester lubricant can be used with the combination of additives than in ester compositions in condition for use in an engine to form a concentrate, and the concentrate can thereafter be diluted with additional ester or esters to form the desired final lubricant compositions. Concentrates are particularly desirable since they can be prepared in one refinery or suitable plant and can then be shipped to other localities where such facilities are lacking but where blending equipment is available. Considerable savings in transportation and equipment costs can be realized. A further extension of this feature is that of preparing mixtures of the additives, that is, components (b) through (e), and (b) through (f), free of ester and transporting the mixtures to a location where they can be incorporated in an ester for formation of the desired lubricant compositions. In the mixtures, the parts by weight of the several additives are in the same proportions with relation to each other as they are in the oil compositions.

It is to be understood that the amount of each additive set forth throughout this application is expressed on an oil-free basis, unless otherwise specified.

The lubricant compositions, concentrates and additive mixtures of this invention can be prepared by intimately mixing the several components at a temperature ranging from about 80 to about 225° C., and preferably at about 140 to about 180° C. No particular order of adding one component to another need be followed.

Examples illustrating and in no sense limiting the invention are given below. All parts are by weight in the examples unless otherwise specified.

*Example 1*

An oil composition was formulated from the following components:

| | Parts by weight |
|---|---|
| Ester A | 94.88 |
| Phenyl-alpha naphthylamine | 1.00 |
| Dioctyl diphenylamine | 1.00 |
| Salt A | 0.1 |
| Quinizarin (1,4-dihydroxyanthraquinone) | 0.02 |
| Tricresyl phosphate | 3.00 |
| Dimethyl silicone, parts per million | 5 |

The several components listed above in this example were stirred together in a kettle at a temperature of about 150° C. for about 30 minutes. A clear, homogeneous product, identified herein as Oil 1 was formed.

Physical properties of Oil 1 are set forth below in Table II.

TABLE II

Property, ASTM standard:

| | |
|---|---|
| Specific gravity @ 60/60° F., D1298 | 1.0021 |
| Total acid number, D664 | 0.08 |
| Viscosity, kinematic, CS, D445: | |
| @ —40° F. | 12,393 |
| @ 100° F. | 28.40 |
| @ 210° F. | 5.19 |
| @ 400° F. | 1.31 |
| Pour point, ° F. | <—80 |
| Flash point, ° F., D92 | 485 |
| Fire point, ° F., D92 | 560 |
| Autogenous ignition point, ° F., D286 | 790 |

*Test data*

Oil 1 and a variety of related lubricant compositions were subjected to a severe oxidation-corrosion test at 425° F. for 48 hours with 5 liters of air per hour contacting the composition under test. Except for time and temperature conditions, the test is Method 5308.4 in Federal Test Method Standard No. 791. Test results are given in Table III below:

TABLE III

| Oil | | A | B | C | D | E | F | G | H | 1 |
|---|---|---|---|---|---|---|---|---|---|---|
| Ester A | (a) | 100 | 98.0 | 97.9 | 94.9 | 94.9 | 94.9 | 92.9 | 94.7 | 94.88 |
| Phenyl-alpha naphthylamine. | (b) | | 1.0 | 1.0 | 1.0 | 2.0 | | 1.0 | 1.0 | 1.0 |
| Dioctyl diphenylamine | (b) | | 1.0 | 1.0 | 1.0 | | 2.0 | 1.0 | 1.0 | 1.0 |
| Salt A | (c) | | | 0.1 | 0.1 | 0.1 | 0.1 | 0.1 | 0.3 | 0.1 |
| 1,4-dihydroxyanthraquinone. | (d) | | | | | | | | | 0.02 |
| Tricresyl phosphate | (e) | | | | 3.0 | 3.0 | 3.0 | 5.0 | 3.0 | 3.0 |
| Dimethyl silicone | (f) | | | | | | | | | 5 p.p.m. |
| K.V. 100° F., percent change. | | +260 | +43 | +35 | +31 | +30 | +68 | +31 | +32 | +32 |
| K.V. 210° F., percent change. | | +161 | +28 | +25 | +17 | +19 | +40 | +21 | +20 | +20 |
| N.N.: | | | | | | | | | | |
| Initial | | 0.2 | 0.1 | 0.1 | 0.2 | 0.1 | 0.1 | 0.1 | 0.2 | 0.08 |
| Final | | 19.0 | 3.2 | 1.7 | 4.1 | 3.0 | 12.0 | 2.5 | 1.5 | 1.7 |
| Visual sludge | | Medium | Nil | Trace | Trace | Trace | Nil | Nil | Trace | Nil |
| Catalyst metals, wt. change, mg./cm.²: | | | | | | | | | | |
| Copper | | —0.21 | —1.30 | —0.11 | —0.11 | —0.02 | —0.06 | —0.07 | —0.03 | —0.09 |
| Steel | | —0.90 | +0.04 | +0.04 | —0.01 | +0.06 | +0.03 | +0.03 | —0.01 | +0.04 |
| Aluminum | | —0.02 | 0.00 | +0.01 | +0.01 | +0.04 | +0.01 | +0.02 | +0.01 | +0.02 |
| Magnesium | | —21.3 | —2.56 | +0.05 | —0.02 | +0.09 | —0.57 | +0.07 | +0.05 | +0.03 |
| Silver | | +0.01 | +0.02 | +0.01 | —0.02 | +0.02 | +0.02 | —0.01 | +0.02 | +0.02 |
| Titanium | | 0.00 | +0.12 | +0.04 | 0.00 | +0.05 | +0.06 | +0.07 | +0.06 | +0.02 |

Ester A is a mixture of neutral esters formed by reaction of pentaerythritol (technical grade comprising about 88% by weight of mono- and about 12% by weight of di-pentaerythritol), pelargonic acids and a mixture of n-valeric acids, namely, commercial isopentanoic acid. The last-mentioned acid is formed by the Oxo Process and is marketed by Union Carbide; it comprises approximately 2 parts by weight of n-valeric acid and 1 part by weight of iso-valeric acid. Ester A, on analysis, reveals a balance of one molar proportion of pentaerythritol, at least about 1 molar proportion of pelargonic acid and about 3 molar proportions of commercial isopentanoic acid.

Salient and identifying physical properties of Ester A, are the following:

Viscosity, kinematic, CS, D445:

| | |
|---|---|
| @ —40° F. | 7250 |
| @ 100° F. | 26.1 |
| @ 210° F. | 5.0 |
| @ 400° F. | 1.3 |
| Pour point, ° F. | <—65 |
| Flash point, ° F., D92 | 495 |
| Fire point, ° F. | 560 |
| Autogenous ignition point, ° F., D286 | 785 |
| Neutralization number, D664 | 0.1 |

Data set out in Table III reveal that Oil A, consisting only of the mixture of "penta" esters identified as Ester A, is seriously deficient in a number of respects. This is indicated by the tremendous viscosity change, acid formation, sludge formation, metal corrosion and, in particular, magnesium loss. Oil B reveals that the combination of antioxidants—phenyl-alpha naphthylamine and dioctyl diphenylamine—with Ester A, serves to reduce viscosity deterioration and acid formation; however, metal corrosion remains a serious problem. When a metal suppressor is added, as illustrated by Oil C, metal corrosion is materially reduced. Results for Oil D, containing tricresyl phosphate, show that no improvement has been realized over Oil C.

A comparison of Oils E and F reveals that dioctyl diphenylamine is not as desirable as an equivalent concentration, 2 percent, of phenyl-alpha naphthylamine. A corresponding comparison of Oils D and E reveals that 2 percent of phenylalpha naphthylamine is approximately as effective as 1 percent of the same compound in combination with 1 percent of dioctyl diphenylamine.

Oil G is provided to indicate that the concentration of tricresyl phosphate can be increased to at least 5 percent. Similarly, Oil H is included to demonstrate that at least 0.3 percent of the metal suppressor Salt A is satisfactory.

Results for Oil 1 demonstrate the unusual balance of desired properties achieved with a combination of all components (a) through (f).

As is known in the art, a variety of jet engines contain bearing cages having lead flashings. Lead corrosion, therefore, is one problem to be met with such engines. A number of compositions have been subjected to a severe test to determine their effectiveness in protecting against lead corrosion. The test used involves stirring a sample of oil with copper and lead plates, while the sample is heated in the presence of air. At the end of the test the loss in weight of the lead plate is determined. The test is identified as Tentative Mobil Method 902–63. Results of such tests are shown in Table IV below.

(standard 1 gallon metal can) of Oil 1 in an oven maintained at 230° F. Samples were taken after 2 days and at the conclusion of the test (7 days). Lead corrosion values were well within military specifications, less than 125 mgs./in.². In addition, inspection of the oil at the conclusion of the test revealed that no suspended matter or precipitate was present in the oil.

It follows from the foregoing description of the invention and the illustrative test data therewith that our new lubricants are admirably adapted for use in lubricating aircraft jet engines. They can also be used in turboprop aircraft engines. Still other uses include lubrication of a variety of military hardware such as helicopter gear boxes and transmissions.

TABLE IV

| Oil | | A | I | J | B | K | D | L | 1 |
|---|---|---|---|---|---|---|---|---|---|
| Ester A | (a) | 100 | 98.0 | 98.0 | 98.0 | 95.0 | 94.9 | 94.88 | 94.88 |
| Phenyl-alpha naphthylamine | (b) | | 2.0 | | 1.0 | 1.0 | 1.0 | 1.0 | 1.0 |
| Dioctyl diphenylamine | (b) | | | 2.0 | 1.0 | 1.0 | 1.0 | 1.0 | 1.0 |
| Salt A | (c) | | | | | | 0.1 | 0.1 | 0.1 |
| 1,4-dihydroxyanthraquinone | (d) | | | | | | | 0.02 | 0.02 |
| Tricresyl phosphate | (e) | | | | | 3.0 | 3.0 | 3.0 | 3.0 |
| Dimethyl silicone | (f) | | | | | | | | 5 p.p.m. |
| Lead loss, mgs./in.² | | 192 | 968 | 155 | 760, 838 | +7.6, +6.3 | 868, 648 | 0.3, 0.04 | 0, 0 |

As indicated by data provided in Table IV, Oil A, consisting of "penta" esters (Ester A), does not protect against lead corrosion. Oils I, J and B demonstrate that amine anti-oxidants do not improve the esters in this respect but, more often, impair the esters. The addition of tricresyl phosphate—Oil K—gives some protection. However, when a metal suppressor is added—Oil D—a complete reversal of behavior results. Excellent results are realized when a second metal suppressor (1,4-dihydroxyanthraquinone) is added, as demonstrated by Oil L.

Finally, the complete protection against lead corrosion is provided by Oil 1 which contains at least one component of each of those identified herein by (a) through (f).

Coupling together the results tabulated in Tables III and IV, it is clear that the standards defined hereinabove for aircraft jet engine lubricants are satisfied with compositions containing a component of each of (a) through (e), and are still more effectively satisfied by compositions defined by components (a) through (f).

Data obtained by a number of investigators using a variety of test procedures closely related to those given above in connection with Tables III and IV, correlate with and confirm the data given in said tables.

Contrast of the great thermal stability of Oil 1 with an oil comprising di-(2-ethylhexyl) sebacate, is shown by a severe thermal test. This involves heating of a quantity of an oil to a given temperature and maintaining the temperature for 90 minutes. The test is conducted in a nitrogen atmosphere, in order to separate thermal and oxidative effects. Results of the tests made are provided in Table V below.

TABLE V

| | Oil 1 | | | Di-(2-ethylhexyl) sebacate | | |
|---|---|---|---|---|---|---|
| Temperature, ° F | 600 | 650 | 700 | 600 | 650 | 700 |
| Weight loss, percent | 0.07 | 0.29 | 5.05 | | | |
| K.V.$_{100°}$ F., percent change | −0.07 | −1.9 | +9.5 | +2.5 | 26.5 | Solid |
| N.N., final | 2.0 | 4.7 | 4.2 | 11.6 | 54.9 | |

Further desirable characteristics of our new lubricants is shown by storage stability tests conducted at −40° F. for a period of six weeks. At the end of the test period, Oil 1 was clear and fluid. No separation occurred and no suspended matter was present. A high temperature storage test was made by storing a one-gallon sample It is to be understood that additional additives can also be present in the lubricant compositions, concentrates and additive combinations described and claimed herein. For example, pour point depressants, viscosity index improvers, rust preventatives, detergents, etc., can be used in customary concentration.

Although the invention has been described herein by means of certain specific embodiments and illustrative examples, it is not intended that it be limited in any way thereby, but only as indicated in the following claims.

We claim:

1. A lubricant comprising:
   (a) a major proportion of an ester formed by the reaction of a pentaerythritol selected from the group consisting of pentaerythritol, di-pentaerythritol, tri-pentaerythritol, tetra-pentaerythritol and mixtures thereof and an organic monocarboxylic acid having from about 2 to about 18 carbon atoms per molecule;
   (b) from about 0.5% to about 5% by weight of the lubricant of an antioxidant selected from the group consisting of a phenylnaphthylamine having the structure

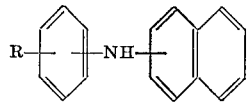

wherein R is selected from the group consisting of hydrogen and methyl, said phenylnaphthylamine in admixture with symmetrical diaryl amines, said phenylnaphthylamine in admixture with lower alkyl-aryl-amines and said phenylnaphthylamine in admixture with di-lower cycloalkyl amines, wherein the said aryl groups each have a carbon atom content in the range of from 6 to about 28;
   (c) from about 0.001 to about 1 percent by weight of the lubricant of an equimolecular salt of 1-salicylalaminoguanidine and an aliphatic carboxylic acid having from about 14 to about 18 carbon atoms per molecule;
   (d) from about 0.001 to about 1 percent by weight of the lubricant of a polyhydroxyanthraquinone; and
   (e) from about 1 to about 10 percent by weight of the lubricant of a phosphorus compound selected from the group consisting of a neutral hydrocarbyl phosphate and a neutral hydrocarbyl phosphite, said phosphorus compound having from about 9 to about 33 carbon atoms.

2. The lubricant defined by claim 1 wherein (a) is a neutral ester.

3. The lubricant defined by claim 1 wherein (a) is formed by reaction of pentaerythritol.

4. The lubricant defined by claim 1 wherein (a) is formed by reaction of pelargonic acid.

5. The lubricant defined by claim 1 wherein (a) is formed by reaction of valeric acids.

6. The lubricant defined by claim 1 wherein (a) is formed by reaction of one molar proportion of pentaerythritol and at least 1.0 molar proportions of pelargonic acid and about 3.0 molar proportions of a mixture of normal- and iso-valeric acids.

7. The lubricant defined by claim 1 wherein (b) is phenyl-alpha naphthylamine.

8. The lubricant defined by claim 1 wherein (b) is a mixture of phenyl-alpha naphthylamine and a dioctyl diphenylamine.

9. The lubricant defined by claim 1 wherein the aliphatic carboxylic acid of (c) is saturated.

10. The lubricant defined by claim 1 wherein the aliphatic carboxylic acid of (c) is unsaturated.

11. The lubricant defined by claim 1 wherein a mixture of aliphatic carboxylic acids is the acid portion of said salt (c).

12. The lubricant defined by claim 1 wherein (d) is a dihydroxyanthraquinone.

13. The lubricant defined by claim 1 wherein (d) is 1,4-dihydroxyanthraquinone.

14. The lubricant defined by claim 1 wherein (e) is tricresyl phosphate.

15. The lubricant defined by claim 1 wherein a defoamant (f) is present in an amount from about 0.0001 to about 0.01 percent by weight of the lubricant.

16. The lubricant defined by claim 1 wherein dimethyl silicone is present in an amount from about 0.0001 to about 0.01 percent by weight of the lubricant.

17. A lubricant comprising:
(a) a major proportion of a mixture of substantially neutral esters formed by reaction of one molar proportion of pentaerythritol with at least 1.0 molar proportions of pelargonic acid and with about 3.0 molar proportions of a mixture comprising about ⅔ by weight of normal valeric acid and about ⅓ of iso-valeric acid;
(b) about 1 percent by weight of phenyl-alpha naphthylamine and about 1 percent by weight of a dioctyl diphenylamine;
(c) about 0.05 percent by weight of an equimolecular salt of 1-salicylalaminoquanidine and a mixture of acids, said mixture comprising about 80 percent by weight of a mixture of fatty acids having 14 to 18 carbon atoms, at least about 50 percent of the acids being unsaturated, and about 20 percent by weight of rosin acids;
(d) about 0.02 percent by weight of quinizarin;
(e) about 3 percent by weight of a tricresyl phosphate; and
(f) about 5 parts per million by weight of dimethyl silicone.

References Cited by the Examiner

UNITED STATES PATENTS

| | | | |
|---|---|---|---|
| 2,584,784 | 2/1952 | Biswell | 260—501 |
| 2,672,448 | 3/1954 | Newnan et al. | 252—404 |
| 2,889,281 | 6/1959 | Matuszak et al. | 252—56 |
| 2,944,973 | 7/1960 | Langer et al. | 252—56 |
| 3,000,827 | 9/1961 | Moler | 252—56 |
| 3,053,768 | 9/1962 | Cupper | 252—56 |

FOREIGN PATENTS 536,837   2/1957   Canada.

DANIEL E. WYMAN, *Primary Examiner.*